United States Patent
Blanchflower et al.

(10) Patent No.: US 9,292,877 B2
(45) Date of Patent: Mar. 22, 2016

(54) METHODS AND SYSTEMS FOR GENERATING CONCEPT-BASED HASH TAGS

(75) Inventors: Sean Mark Blanchflower, Cambridge (GB); Simon Hayhurst, Palo Alto, CA (US)

(73) Assignee: Longsand Limited, Cambridge (GB)

(*) Notice: Subject to any disclaimer, the term of this patent is extended or adjusted under 35 U.S.C. 154(b) by 678 days.

(21) Appl. No.: 13/086,350

(22) Filed: Apr. 13, 2011

(65) Prior Publication Data

US 2012/0265806 A1  Oct. 18, 2012

(51) Int. Cl.

| | |
|---|---|
| G06F 15/16 | (2006.01) |
| G06Q 50/00 | (2012.01) |
| G06Q 10/10 | (2012.01) |
| G06F 17/30 | (2006.01) |
| H04L 12/58 | (2006.01) |

(52) U.S. Cl.
CPC .......... G06Q 50/01 (2013.01); G06F 17/30867 (2013.01); G06Q 10/10 (2013.01); H04L 51/32 (2013.01)

(58) Field of Classification Search
CPC ... G06F 17/30867; G06Q 10/10; H04L 51/32
USPC ........................................................ 709/224
See application file for complete search history.

(56) References Cited

U.S. PATENT DOCUMENTS

| | | | |
|---|---|---|---|
| 7,512,900 B2 | 3/2009 | Lynch et al. | |
| 7,685,198 B2 * | 3/2010 | Xu et al. | 707/748 |
| 7,788,358 B2 * | 8/2010 | Martino | 709/223 |
| 7,904,524 B2 * | 3/2011 | Wehner et al. | 709/206 |

(Continued)

OTHER PUBLICATIONS

Wu et al. 2010. Automatic Generation of Personalized Annotation Tags for Twitter Users. HLT '10 Human Language Technologies: The 2010 Annual Conference of the North American Chapter of the Association for Computational Linguistics. 2010. pp. 689-692. [retrieved on Jun. 18, 2012]. Retrieved from internet: <URL: http://dl.acm.org/citation.cfm?id=1858100 >.

(Continued)

*Primary Examiner* — Hua Fan
(74) *Attorney, Agent, or Firm* — Rutan & Tucker, LLP

(57) ABSTRACT

Methods for automatically recommending hash tags for use with comments generated by the comment authors comprise analyzing existing comments to determine reach and influence of authors of the existing comment, and hash tags and keywords that are included in the existing comments. The methods further comprise using the comment and linked content of links included in the existing comment to determine concept information associated with the existing comments, where the concept information is determined using a server computing system configured with an Intelligent Data Operating Layer (IDOL) application, and where the concept information, the reach and influence information, the keywords and the hash tags are stored in a hash tag database. The methods further comprise analyzing new comments as they are being generated by authors of the new comments where the new comments and any linked content associated with the new comments are analyzed by the server computing system configured with the IDOL application to determine related concept information, and recommending possible hash tags to the authors of the new comments using the concept information of the new comments and the information stored in the hash tag database.

20 Claims, 14 Drawing Sheets

(56) References Cited

U.S. PATENT DOCUMENTS

| | | | |
|---|---|---|---|
| 7,925,743 B2 * | 4/2011 | Neely et al. | 709/224 |
| 8,229,743 B2 | 7/2012 | Carter et al. | |
| 8,356,077 B2 * | 1/2013 | Robinson et al. | 709/207 |
| 8,775,429 B2 * | 7/2014 | Choudhary et al. | 707/738 |
| 2007/0174247 A1 * | 7/2007 | Xu et al. | 707/3 |
| 2008/0086688 A1 * | 4/2008 | Chandratillake et al. | 715/719 |
| 2009/0048904 A1 * | 2/2009 | Newton et al. | 705/10 |
| 2009/0222551 A1 * | 9/2009 | Neely et al. | 709/224 |
| 2009/0319363 A1 * | 12/2009 | Callaghan et al. | 705/14.36 |
| 2010/0023506 A1 * | 1/2010 | Sahni et al. | 707/5 |
| 2010/0077300 A1 * | 3/2010 | Dugan et al. | 715/273 |
| 2010/0153213 A1 | 6/2010 | Pomplun et al. | |
| 2010/0161631 A1 * | 6/2010 | Yu et al. | 707/758 |
| 2010/0205254 A1 * | 8/2010 | Ham | 709/206 |
| 2011/0173264 A1 * | 7/2011 | Kelly | 709/205 |
| 2011/0225293 A1 * | 9/2011 | Rathod | 709/224 |
| 2012/0110174 A1 * | 5/2012 | Wootton et al. | 709/224 |
| 2012/0210247 A1 * | 8/2012 | Khouri et al. | 715/751 |
| 2012/0246302 A1 * | 9/2012 | Lafleur et al. | 709/224 |
| 2013/0185422 A1 * | 7/2013 | Rogers et al. | 709/224 |
| 2013/0232263 A1 * | 9/2013 | Kelly et al. | 709/224 |

OTHER PUBLICATIONS

Esparza et al. Towards Tagging and Categorisation for Micro-blogs. 21st National Conference on Artificial Intelligence and Cognitive Science (AICS 2010). Aug. 30, 2010. [retrieved on Jun. 18, 2012]. Retrieved from Internet: <URL: http://irserver.ucd.ie/dspace/handle/10197/2517 >.

Gannes, Liz, "The Short and Illustrious History of Twitter #Hashtags", http://gigaom.com/2010/04/30/the-short-and-illustrious-history-of-twitter-hashtags/, Apr. 23, 2010, 15 pages.

International Search Report and Written Opinion for International Patent Application No. PCT/US12/33388 dated Jun. 28, 2012, 11 pages.

* cited by examiner (Corpus Analyzer)

(Comment Analyzer)

METHODS AND SYSTEMS FOR GENERATING CONCEPT-BASED HASH TAGS

FIELD

Embodiments of the present invention generally relate to the field of social network, and in some embodiments, specifically relate to the generation of hash tags associated with comments posted by users while using social network applications.

BACKGROUND

A hash tag is a combination of hash symbol "#" and a keyword generically referred to as a tag. A user may use a hash tag with a comment to indicate a topic, grouping, or category that the comment is associated with. Hash tags are popular with micro blog sites (e.g., Twitter by Twitter, Inc. of San Francisco, Calif.) and other social network sites. For example, a user may associate a comment related to the movie Harry Potter with the hash tag #harrypotter. A user may associate a comment related to Europe with the hash tag #europe. The hash tags are typically inserted in line with the comment. Multiple hash tags may be used per comment. The number of characters allowed per comment by a social network site may be limited. For example, Twitter only allows a maximum of 140 characters. Since the hash tags are added in line with the comment, this may reduce the number of characters available for the comment itself.

SUMMARY

For some embodiments, a system to automatically recommend hash tags for use with comments generated by the comment authors comprises a corpus analyzer, a hash tag database, a comment analyzer, and a comment publisher. The system enables generation of hash tags from conceptual analysis of comment to increase the reach and impact of a comment. The comments may be associated with a social network application. The corpus analyzer is configured to analyze existing comments to populate a hash tag database with information. This includes determining the reach and influence of the authors of the existing comment, and hash tags and keywords that may be included in the existing comments. The corpus analyzer is coupled with a concept server which is configured to use the comment and any related linked content to determine concept information that may be associated with the existing comments. The concept information, the reach and influence information, the keywords and the hash tags may be stored in the hash tag database. The comment analyzer may be configured to analyze new comments as they are being generated by the authors of the comments. The comment analyzer may use the information stored in the hash tag database and the concept information determined by the concept server to determine possible hash tags that may be recommended to the authors. The recommended hash tags may be prioritized based at least on the hash tags that have the highest reach, how recently and heavily they have been used, and the concepts they are associated with. The hash tag database is configured to store all the hash tags that are in use, along with information on their reach information and their related concept information.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

DETAILED DESCRIPTION

For some embodiments, as comments are being generated by their authors, the comments are analyzed in real time to determine possible related concept information. The analysis may be based on the keywords included in the comments and based on linked content of any links that may be included in the comments. Using the concept information, possible hash tags from a hash tag database may be recommended to the authors. The hash tags that are selected by the authors are included in the comments. At any point in its lifecycle, a comment may be analyzed and compared to the corpus of hash tags stored in the hash tag database such that the most conceptually relevant hash tag(s) can then be determined. This may allow enhancing an existing comment with more relevant hash tags.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Figure 1:
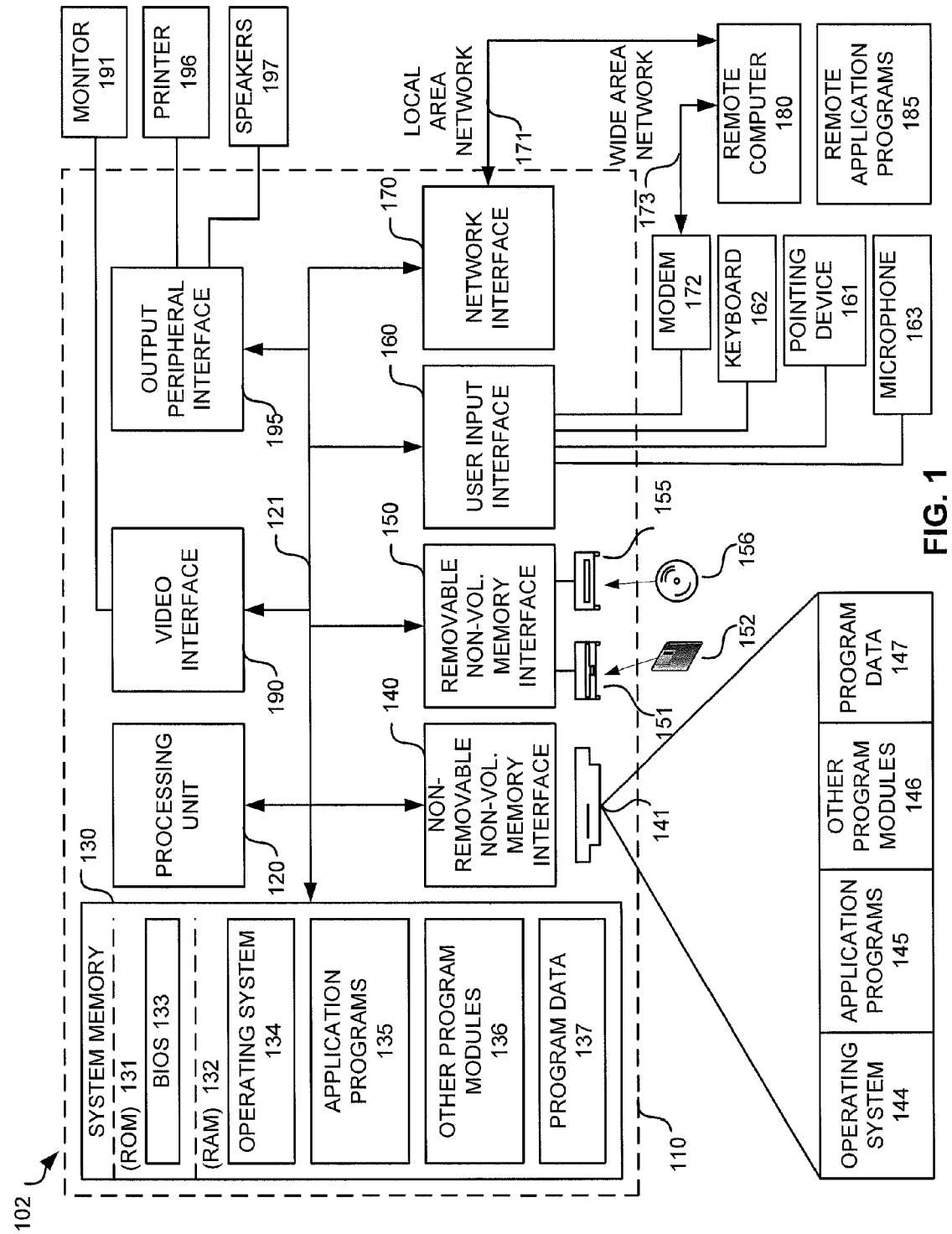
FIG. 1 illustrates a block diagram of an example computing system that may use an embodiment of one or more of the software applications discussed herein.
Figure 2:
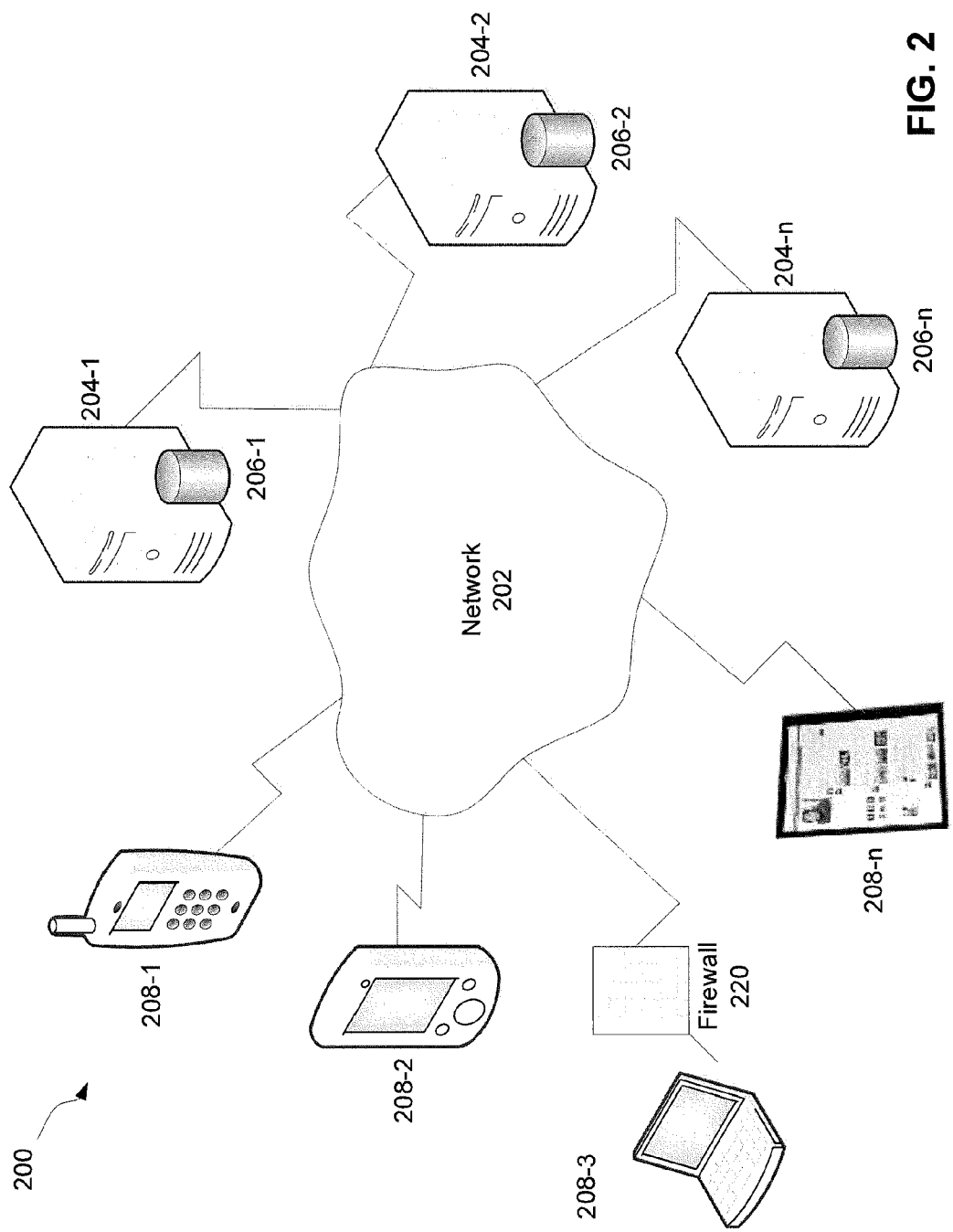
FIG. 2 illustrates an example of a network that may be used with embodiments of the invention.

FIG. 1 and FIG. 2 illustrate example environments to implement the hash tag concepts herein.

Overview

Hash tags are typically generated and included in comments that are to be posted in blogs or blog site such as, for example, Twitter. A comment described herein is similar to a tweet in Twitter. An author of a comment described herein is similar to a user who generates a tweet. The terms "author" and "user" may be used interchangeably. Although the hash tags may be more commonly be associated with blogs, they may also be used in websites or any sites that allow comments to be generated, posted and be visible to others. The authors of the comments may add the hash tags in order to allow the comments to be categorized or grouped with other similar comments. The authors may generate a new hash tag or use a hash tag that has been generated by another author. This approach may not result in the use of the correct hash tags since it depends on what the author believes what the right hash tags are.

Figure 3A:
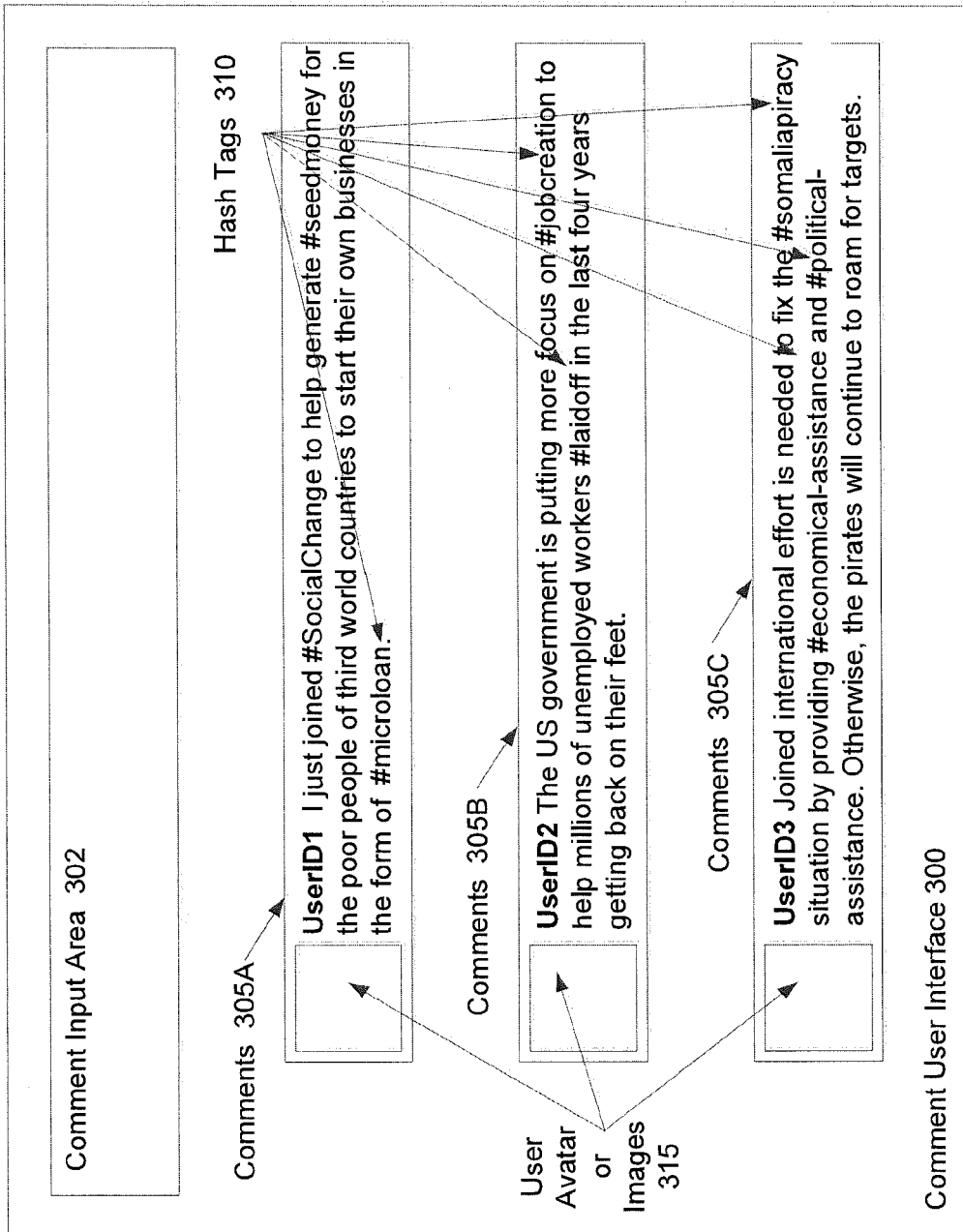
FIG. 3A illustrates an example of a hash tag generated by a user, in accordance with some embodiments.

FIG. 3A illustrates one example of a comment user interface that may be used, in accordance with some embodiments. Comment user interface 300 may include a comment input area 302 to allow a user to post a comment. The total number of characters that may be allowed per comment may vary depending on the implementation. For example, Twitter comments are limited to 140 characters. The comment user interface 300 also allows the user to view comments posted by other users. Some examples of these comments are illustrated as comments 305A-305C. Each comment may include a textual content portion and an image or avatar portion 315. The textual content portion may include zero or more hash tags such as, for example, hash tags 310.

Figure 3B:
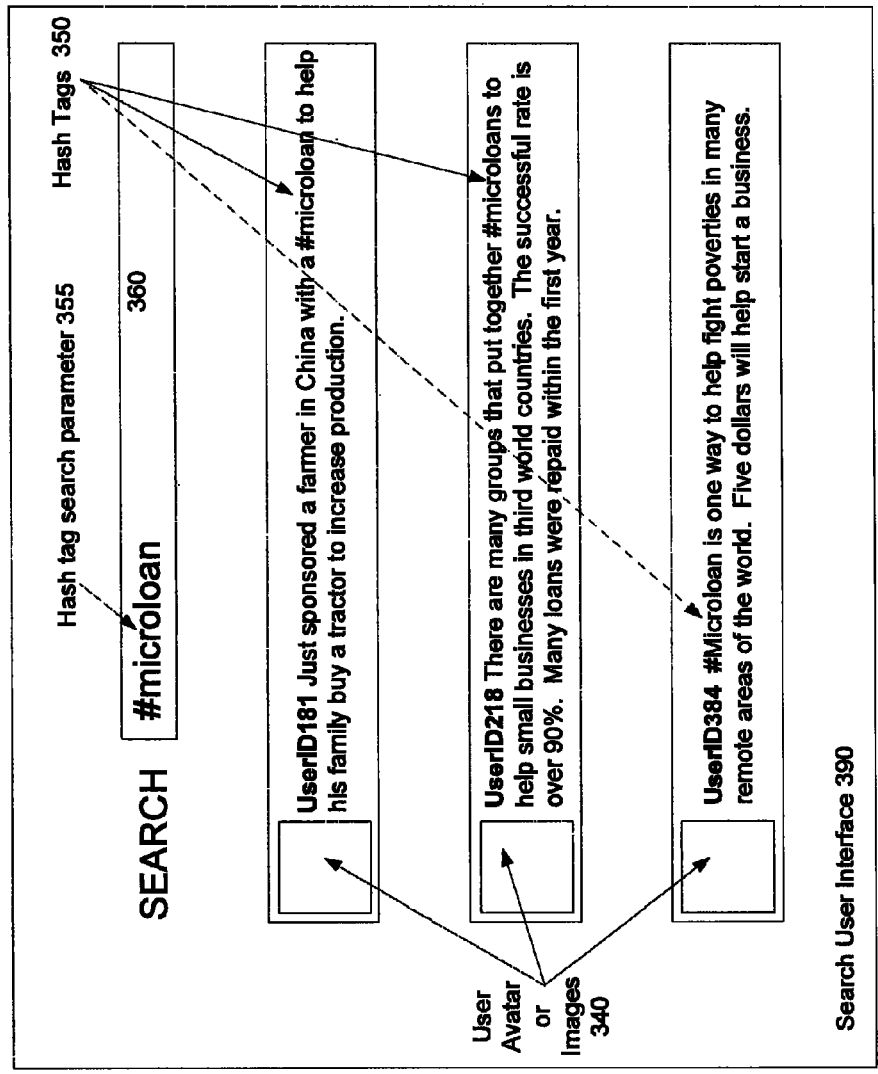
FIG. 3B illustrates an example of comments that are associated with a hash tag, in accordance with some embodiments.

FIG. 3B illustrates an example of a search user interface that may be used, in accordance with some embodiments. Search user interface 390 may include a search input area 360 to allow a user to enter a hash tag search parameter. For example, the user may use the search parameter 355 as #microloan to search for all comments that may be associated with that hash tag. The results of the search may be displayed by the search user interface 390 in an area that is proximal to the search input area 360. For example, the search result may include the three comments illustrated in FIG. 3B, with each of these comments being associated with the common hash tag 350 as #microloan.

A user of a social network application that uses hash tags may be associated with a primary set of followers who receive the comments posted by the user. The larger the number of followers in the primary set, the more people the comments and hash tags will be exposed to. Each of the followers in the primary set may be associated with a secondary set of followers, and so on. The more followers there are in the primary set, in the secondary set, and in the subsequent sets, the more influence the user has. As such, a comment posted by the user using a particular hash tag will likely give that hash tag considerable reach. As will be described, this reach information of a hash tag may be considered when the hash tag is recommended to a user.

Hash Tag System

Figure 4:
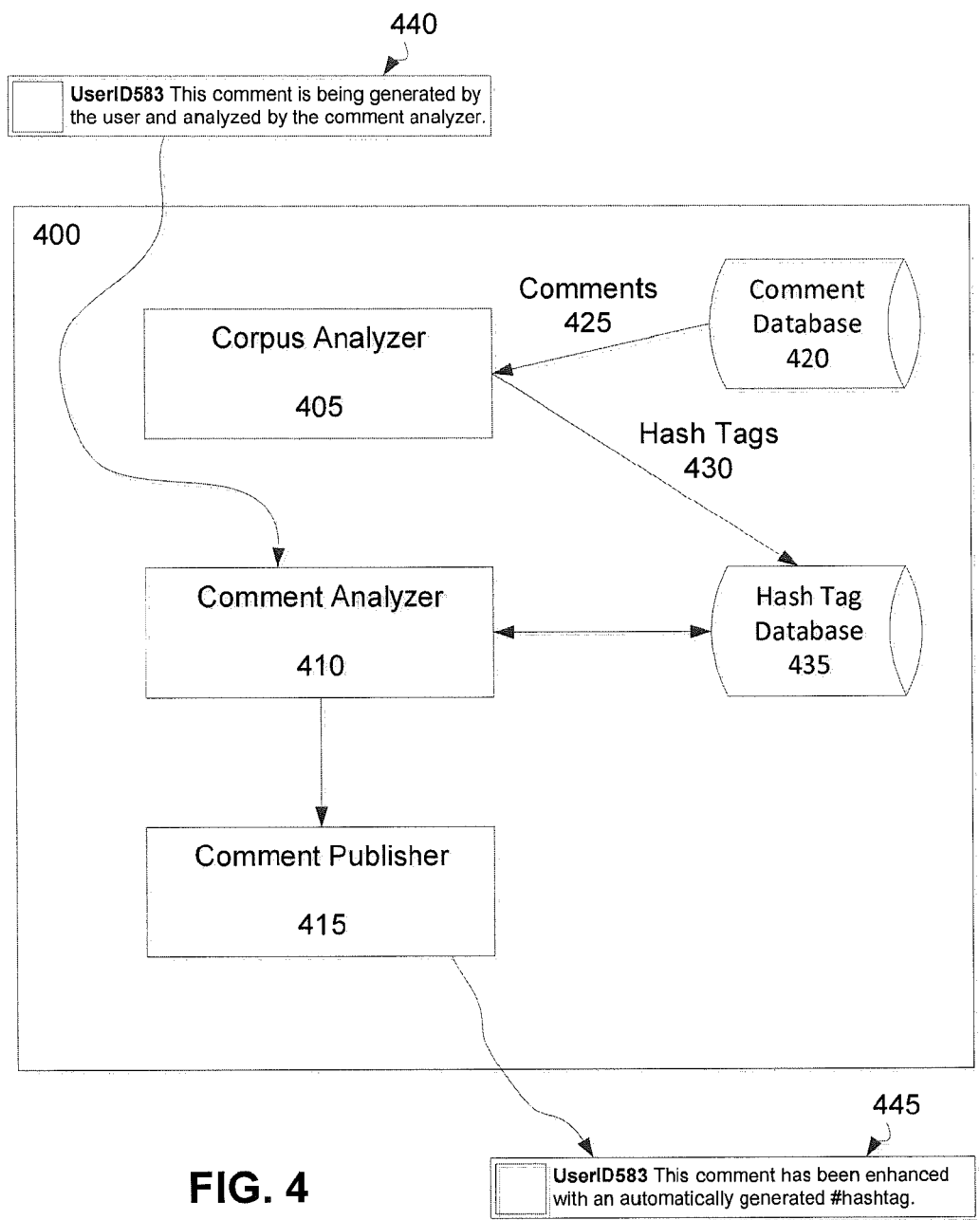
FIG. 4 illustrates an example of components of a network that may be used to generate hash tags based on concepts included in user generated comments, in accordance with some embodiments.

FIG. 4 illustrates an example of components of a system that may be used to generate hash tags based on concepts included in user generated comments, in accordance with some embodiments. System 400 may include a corpus analyzer 405 configured to analyze a large collection of comments 425 that have been posted by their authors. The comments 425 may be associated with a certain application such as, for example, social network applications like Twitter. The comments 425 may have been stored in a comment database 420. It is possible that some of the comments stored in the comment database 420 may not be associated with any hash tags, while some other comments may be associated with multiple hash tags. The corpus analyzer 405 may identify and extract the hash tags 430 in the comments 425 and store them in the hash tag database 435. The corpus analyzer 405 may determine the salient features and particularities of each hash tag and store that information in the hash tag database 435. It is possible that the corpus analyzer 405 may be configured to analyze comments associated with multiple social network applications or even all applications categorized within the social media space. As the corpus analyzer 405 performs its analysis, it observes and identifies the hash tags that have the highest reach, their frequency of use, their usage popularity, and the concept information that those hash tags are associated with, among other operations. The corpus analyzer 405 may then store all of its findings in the hash tag database 435.

The system 400 may also include a comment analyzer 410 configured to analyze comments being generated by a user such as, for example, comment 440. The comment analyzer may determine the key concepts included in the comments, and uses these key concepts to search the hash tag database 435 to find one or more relevant hash tags to recommend to the user. For some embodiments, the comment analyzer 410 may select the hash tags that may be associated with large depth and recommends these. In addition to storing the hash tags, the hash tag database 435 may also store other information to help the comment analyzer 410 filters and selects the appropriate hash tags including depth and concept information. The recommended hash tags may then be presented to the author of the comment 440 for selection, or the hash tags may be selected automatically for inclusion into the comment 440. The publisher 415 then takes the user input and generates the enhanced comment 445.

Corpus Analyzer

Figure 5:
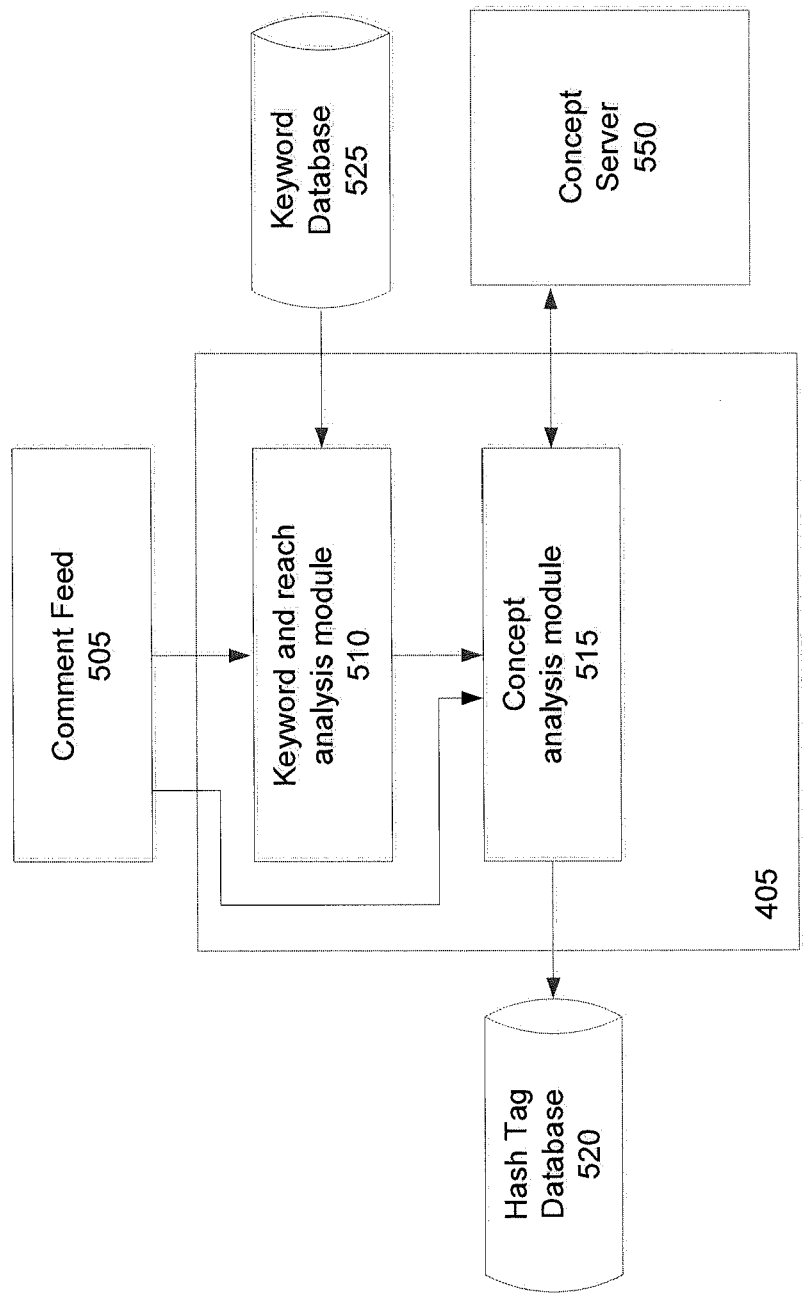
FIG. 5 illustrates an example of modules that may be included in a corpus analyzer, in accordance with some embodiments.

FIG. 5 is a block diagram that illustrates example modules of a corpus analyzer, in accordance with some embodiments. The corpus analyzer described in this diagram may be similar to the corpus analyzer 405 illustrated in FIG. 4. The corpus analyzer 405 may include keyword and reach analysis module 510 and concept analysis module 515.

The keyword and reach analysis module 510 may be configured to receive comments from the comment feed 505. These comments may have previously been generated by many authors. For some embodiments, the comment feed 505 may be a subset or a pool of the comment database 420 illustrated in FIG. 4. The comment feed 505 may be available on a subscription basis from an organization associated with the social network application. For some embodiments, the keyword and reach analysis module 510 may determine the reach and influence of the authors of the comments. This may include examining the number of followers that the authors have. These followers are referred to as the primary followers. The keyword and reach analysis module 510 may also examine at least followers of the followers. These followers are referred to as the secondary followers. The keyword and reach analysis module 510 may also examine prior comments posted by the same authors to determine how broadly those comments were distributed (viewed or picked up) to determine the reach and influence information.

For some embodiments, the keyword and reach analysis module 510 may examine the comments to identify the keywords that may be included in the comments. The keyword and reach analysis module 510 may use the keywords stored in the keyword database 525 to match with the keywords found in the comments. For example, the keywords may be proper nouns or words that have high frequency of usage as well as words that are associated with important events. A keyword may be a single word or a phrase of several words.

For some embodiments, the frequency with which a hash tag is searched for, or with which that hash tag comes up in a search may also be used to determine the reach information of the hash tags. This search information may be tracked by the social network application or by organizations associated with the social network applications. An example of a search interface is illustrated in FIG. 3B.

The keyword and reach analysis module 510 may send the hash tags, the keywords, the reach and influence information, and the comments to the concept analysis module 515. The concept analysis module 515 is configured to send the comments to the concept server 550. The concept analysis module 515 may examine the comments to determine if links are included. The links may be specified in the form of a uniform resource location (URL) in long form or short form (e.g. tiny URL). When there are links, at least some of the linked content (e.g., blog content, website content, etc.) may be examined and extracted by the concept analysis module 515 and sent to the concept server 550. The concept server 550 may analyze the comments and uses the linked content to determine the concepts that may be associated with the comments.

Figure 9:
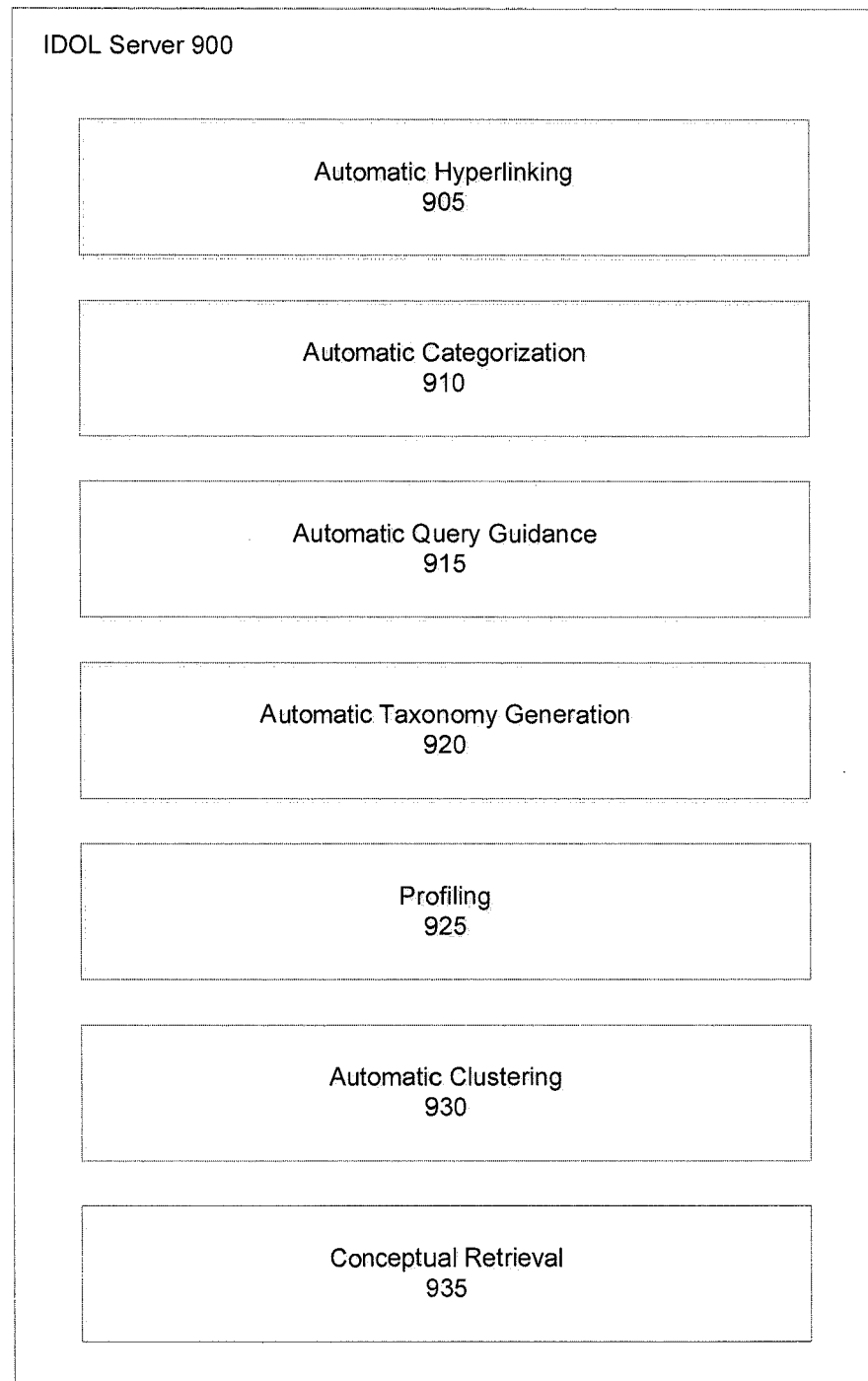
FIG. 9 illustrates an example block diagram of some modules of an IDOL server, in accordance with some embodiments.

For some embodiments, the concept server 550 may be implemented as an Intelligent Data Operating Layer (IDOL) server using the IDOL application—a software product of Autonomy Corporation of San Francisco, Calif. Other software and systems associated with the IDOL application may also be used. The IDOL application collects indexed data from connectors from various sources to train the engines and stores it in its proprietary structure, optimized for fast processing and retrieval of data. As the information processing layer, the IDOL application forms a conceptual and contextual understanding of all content in an enterprise, automatically analyzing any piece of information from over thousands of different content formats and even people's interests. Hundreds of operations can be performed on digital content by the IDOL application, including hyperlinking, agents, summarization, taxonomy generation, clustering, eduction, profiling, alerting and retrieval. The IDOL application has a knowledge base of concept information and is able to inter-relate the concept information with the keywords and the linked-site content information received from the keyword and reach analysis module 510. An example of the modules included in the IDOL application is illustrated in FIG. 9.

The IDOL application enables organizations to benefit from automation without losing manual control. This complementary approach allows automatic processing to be combined with a variety of human controllable overrides, offering the best of both worlds and never requiring an "either/or" choice. The IDOL application integrates with all known legacy systems, eliminating the need for organizations to cobble together multiple systems to support their disparate component.

The IDOL application may be associated with an IDOL connector which is capable of connecting to hundreds of content repositories and supporting over thousands of file formats. This provides the ability to aggregate and index any form of structured, semi-structured and unstructured data into a single index, regardless of where the file resides. The extensive set of connectors enables a single point of search for all enterprise information (including rich media), saving organizations much time and money. With access to virtually every piece of content, the IDOL application provides a 360 degree view of an organization's data assets.

The IDOL application implements a conceptual technology, is context-aware, and uses deep audio and video indexing techniques to find the most relevant products, including music, games and videos. The IDOL application categorizes content automatically to offer intuitive navigation without manual input. The IDOL application also generates links to conceptually similar content without the user having to search. The IDOL application may be trained with free-text descriptions and sample images such as a snapshot of a product. A business console presents live metrics on query patterns, popularity, and click-through, allowing the operators to configure the environment, set-up promotions and adjust relevance in response to changing demand.

For some embodiments, the IDOL application (in the concept server 550) may use the information received from the keyword and reach analysis module 510 to determine key concepts in the comments. It may use eduction to derive potential new hash tags to be used with the comments. The concept analysis module 515 may store the reach information, the educted hash tags, keywords, concept information, and associated content in the hash tag database 520. The concept information is stored in the hash tag database 520 for future use and can be updated at any point.

The concept analysis module 515 is configured to receive the concept information from the concept server 550. The concept information may be associated with a comment that was sent to the concept server 550. The concept analysis module 515 may then use one or more of the concept information, the reach and influence information associated with the author of the comment, the keywords included in the comment, and the hash tags that are already included in the comment to generate new hash tags. The new hash tags and the information received from the concept server 550 and the keyword and reach analysis module 510 may then be stored in the hash tag database 520.

The operations of the corpus analyzer 405 may help add new hash tags to existing comments that do not include hash tags, enhance existing comments that may have less relevant hash tags with more relevant hash tags, and improve the content of the hash tag database 520. As will be described, the hash tag database 520 is very useful in determining and recommending potential hash tags to the authors of the comments as they are being generated.

Comment Analyzer

Figure 6:
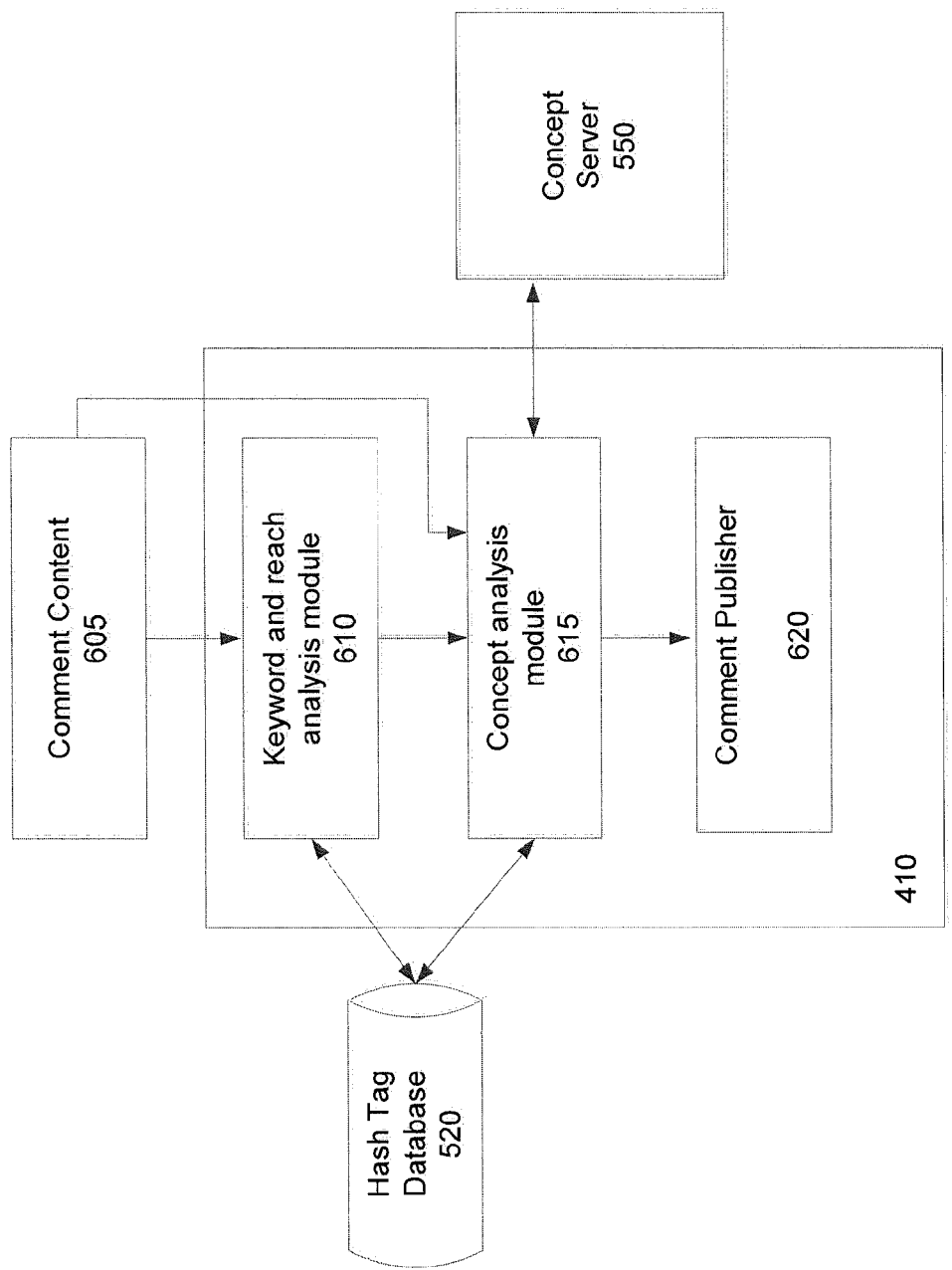
FIG. 6 illustrates an example of modules that may be included in a comment analyzer, in accordance with some embodiments.

FIG. 6 illustrates an example of modules that may be included in a comment analyzer, in accordance with some embodiments. The comment analyzer described in this diagram may be similar to the comment analyzer 410 illustrated in FIG. 4. The comment analyzer 410 may include keyword analysis module 610, concept analysis module 615, and publisher module 620. The concept analysis module 615 of the comment analyzer 420 may be configured to perform operations similar to the concept analysis module 515 of the corpus analyzer 405. The comment analyzer 410 may be coupled with the hash tag database 520 and the concept server 550.

For some embodiments, the keyword analysis module 610 may receive comment 605 as it is being generated by its author. The keyword analysis module 610 then generates a list of keywords based on the comment 605. As described above, the hash tag database 520 may have been populated with hash tags and keywords by the corpus analyzer 405. The keywords from the comment 605 may then be used to identify the potential hash tags stored in the hash tag database 520. For example, the hash tag database 520 may include a list of keywords and each keyword may be mapped to a hash tag. The potential hash tags may then be prioritized. Various priority schemes may be used. For some embodiments, a priority scheme based on a combination of the reach and influence factor and the recent usage factor may be used. It may be possible that there is limited reach and influence information associated with an author who has not posted many comments as compared to an author who has posted many comments. Thus, a hash tag associated with a comment posted by an author who has much reach and influence information may be ranked higher than other hash tags. Similarly, a hash tag that has been used more frequently or more recently than other hash tags may be ranked higher than the other hash tags. Further, when considering the reach and influence factor, the priority scheme may need to consider decaying factor. For example, the reach and influence factor associated with an author may have less significance when the author becomes older as compared to when the author is younger.

The concept analysis module 615 may be configured to transmit the comment 605 to the concept server 550. The concept analysis module 615 may also follow any links that may be included in the comment 605 and transmit linked content to the concept server 550. As described above, the concept server 550 may be configured with the IDOL application, and it may be able to form a conceptual and contextual understanding of the comment to determine the concept information included in the comment. The concept analysis module 615 may then use the concept information from the concept server 550 and the hash tags from the hash tag database 520 to determine the most relevant hash tags from the hash tag database 520. From the possible relevant hash tags, the concept analysis module 615 then use a combination of reach and influence information associated with the author, and the recent usage information of the possible hash tags to prioritize the hash tags. These prioritized hash tags are sent to the comment publisher module 620.

The comment publisher module 620 may be configured to examine the prioritized hash tags generated by the concept analysis module 615 and present these hash tags to the author of the comment. An example interface that may be used to recommend the hash tags is illustrated in FIG. 8D.

For some embodiments, the comment publisher module 620 may also provide an indication about how a hash tag may affect the length of the comment in those situations where the length of the comments is limited. The comment publisher module 620 may propose a highest ranked hash tag to be automatically included in the comment. Some indication of the reach and influence information may also be presented. For example, the reach and influence information may be presented as a sliding scale of colors ranging from low reach to high reach. The author may then have the option to select one or more hash tags presented by the comment publisher module 620. For example, the author may select the top priority hash tag to be included in the comment automatically, or the author may select the hash tags out of the priority order, or the author may select the automatic hash tag inclusion option as well as manually selecting additional hash tags for inclusion in the comment. When the author finishes the selection of the hash tags, the comment publisher module 620 may then post the comment using any posting options made available by the social network application. For example, this may be performed via one or more application programming interfaces (API) published by the organization associated with the social network application.

Mirroring and Distributed Processing

Referring back to FIG. 4, in some embodiments, the system 400 may be implemented in a server computing system that is associated with a third party rather than the organization that owns or operate the social network application. Alternatively, the system 400 and the social network application may be owned and operated by the same entity. In either situation, the system 400 and/or its components may be mirrored across many sites located in different geographical areas to accommodate the demand and usage by many authors. For example, at a first site, there may be one or more server computing systems configured to perform the operations of the corpus analyzer 405. There may be one or more server computing systems configured to perform the operations of the comment analyzer 410 and the operations of the comment publisher 415. Similarly, at the first site, there may be one or more server computing systems such as the concept server 550 illustrated in FIGS. 5 and 6. Further, there may be multiple mirrored sites, each having similar hardware and software configuration and set up. The multiple sites may collaborate with one another in a distributed manner to help speed up the analysis of the comments so that the hash tags may be recommended in real time or near real time. For example, a comment may be associated with different concepts, and instead of waiting for one concept server to analyze and identify many possible concepts, multiple concept servers may be used.

Flow Diagrams

Figure 7A:
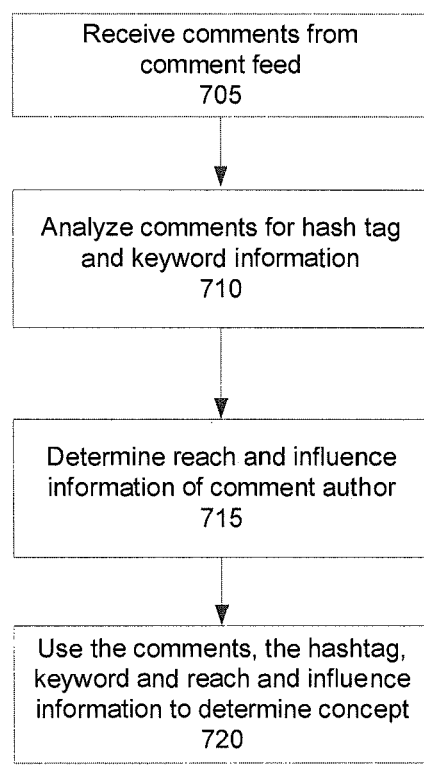
FIG. 7A illustrates an example flow diagram of a process that may be performed by the corpus analyzer, in accordance with some embodiments.

FIG. 7A illustrates an example flow diagram of a process that may be performed by the keyword and reach analysis module included in the corpus analyzer, in accordance with some embodiments. The keyword and reach analysis module is illustrated and described with FIG. 5. At block 705, the existing comments are received. These comments may have been stored in a comment database associated with the corresponding social network application. When the keyword and reach analysis module 510 is operated by a third party and not by the organization associated with the social network application, permission may be necessary to access the comments. For example, the access may be available on a subscription basis. At block 710, the comments are analyzed for keywords and any hash tags that may have been added by the authors. At block 715, the reach and influence information about the authors of the comments is determined. As described above, this may be based at least on the number of followers of the authors and their followers. The reach and influence information, the keywords and hash tag information may then be stored in a hash tag database.

Figure 7B:
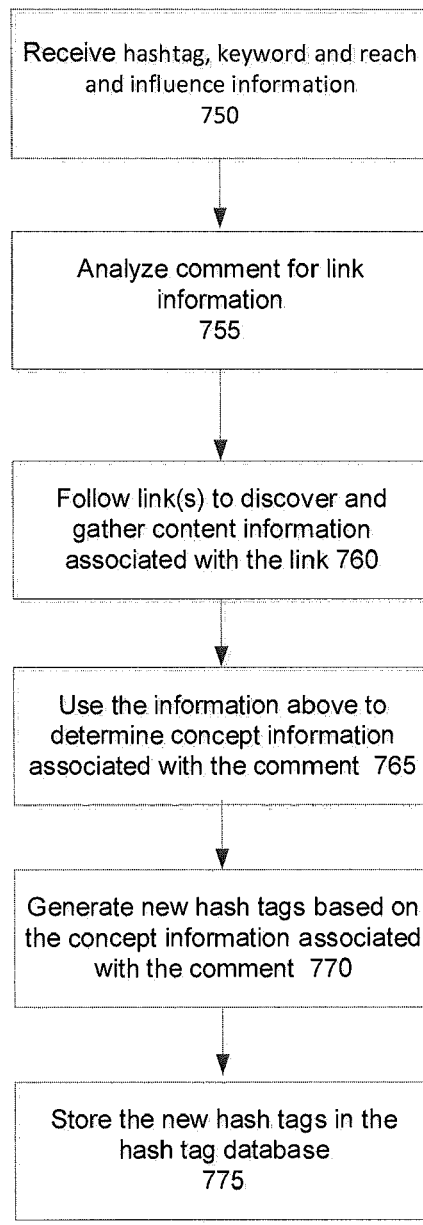
FIG. 7B illustrates an example flow diagram of a process that may be performed by a server coupled with the corpus analyzer, in accordance with some embodiments.

FIG. 7B illustrates an example flow diagram of a process that may be performed by a concept analysis module included in the corpus analyzer, in accordance with some embodiments. The concept analysis module is illustrated and described with FIG. 5. At block 750, the comment is received. At block 755, the comment is analyzed to determine if it includes any links. Where the links are included, the links are followed to capture the linked content, as shown in block 760. At block 765, the information received from operations performed in block 750 and 760 are used to determine concept information that may be associated with the comment. This determination may include transmitting the comment and linked content to a concept server that is configured with the IDOL application. At block 770, based on one or more of the concept information, the reach and influence information associated with the author of the comment, the keywords included in the comment, and the hash tags that are already included in the comment, new hash tags may be generated. The new hash tags, the concept information, and the keyword and reach and influence information may then be stored in the hash tag database.

Figure 8A:
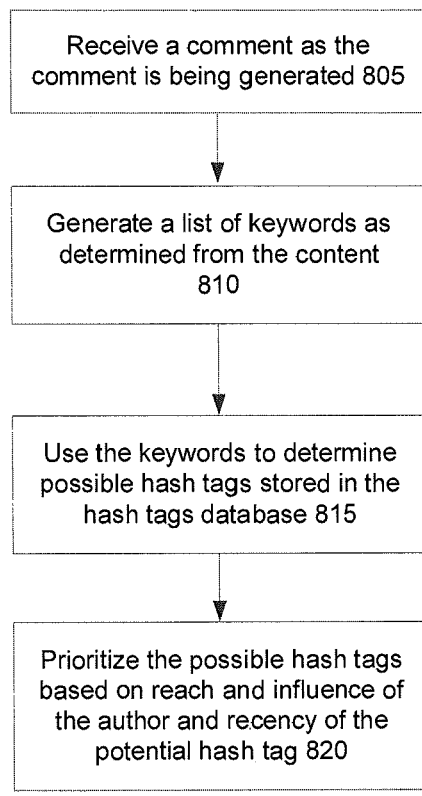
FIG. 8A illustrates an example flow diagram of a process that may be performed by the comment analyzer, in accordance with some embodiments.

FIG. 8A illustrates an example flow diagram of a process that may be performed by the keyword and reach analysis module included in the comment analyzer, in accordance with some embodiments. In this example, the operations performed by the keyword and reach analysis module are based on comments that are being generated by the authors. As such, these operations may be performed in real time. At block 805 the comments are received. At block 810, a list of keywords may be generated by examining the comment as it is being generated. At block 815, the keywords from the comment are used to compare with the keywords stored in the hash tag database to find potential hash tags which are associated with the keywords. At block 820, the potential hash tags are prioritized. The priority may be made based on the reach and influence information and based how recent and how frequent the potential hash tags are used.

Figure 8B:
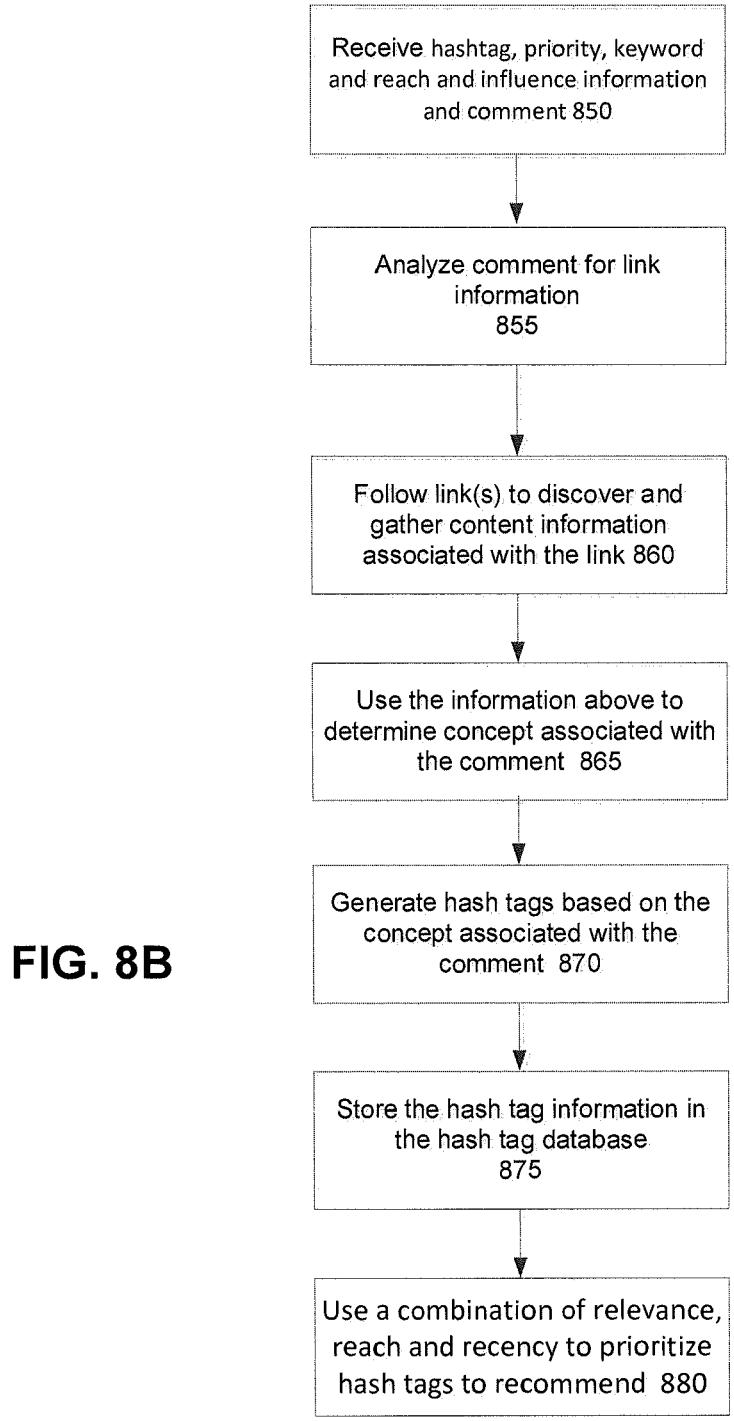
FIG. 8B illustrates an example flow diagram of a process that may be performed by server coupled with the comment analyzer, in accordance with some embodiments.

FIG. 8B illustrates an example flow diagram of a process that may be performed by the concept analysis module included in the comment analyzer, in accordance with some embodiments. At block 850, the comment is received. At block 855, the comment is analyzed to determine if there is a link. At block 860, when there is a link, the linked content is reviewed and extracted. At block 865, the information generated by the previous operations is used to determine concepts that may be associated with the comment. This includes transmitting some of the information to a concept server 550 that is configured with the IDOL application. At block 870, based on the concept information, one or more potential hash tags may be found using the information previously stored in the hash tag database 520. For example, this may be performed by matching the concept information included in the comment with the concept information stored in the hash tag database. At block 875, the determined hash tags, the comment and other related information may be stored in the hash tag database. At block 880, the hash tags may be prioritized before being presented to the author. The priority may be based on relevance of the hash tags to the comment, reach and influence information of the authors, and how recent and frequent the potential hash tags may have been used.

Figure 8C:
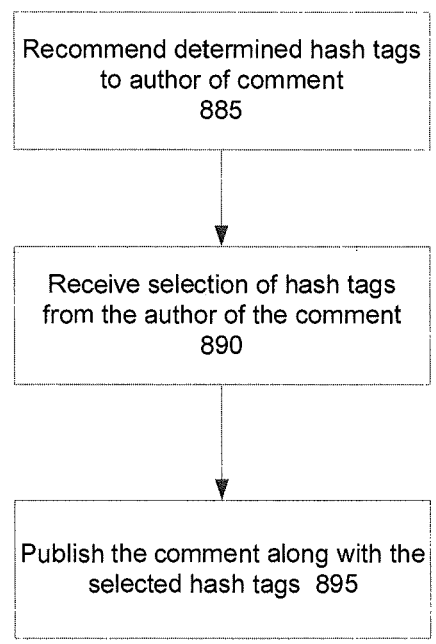
FIG. 8C illustrates an example flow diagram of a process that may be performed by a publisher to recommend hash tags to an author of a comment, in accordance with some embodiments.
Figure 8D:
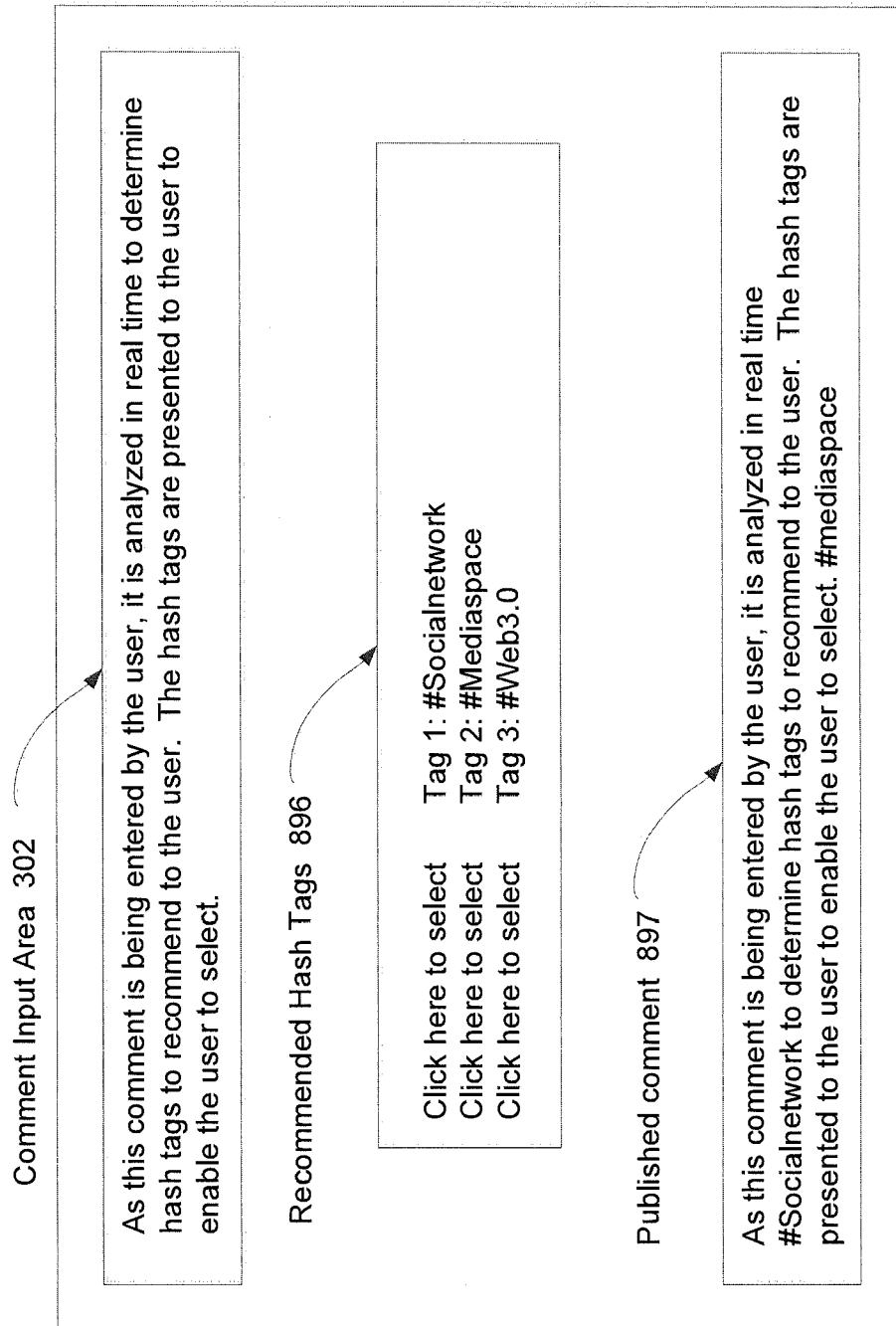
FIG. 8D illustrates an example user interface that may be presented to an author to allow the author to select one or more recommended hash tags, in accordance with some embodiments.

FIG. 8C illustrates an example flow diagram of a process that may be performed by the publisher module, in accordance with some embodiments. At block 885, the recommended hash tags are presented to the author. At block 890, input may be received from the author indicating which of the recommended hash tags the author wants to use. At block 895, the comment and the selected hash tags are published or posted.

FIG. 8D illustrates one example of a user interface that may be used to present the recommended hash tags to the author, in accordance with some embodiments. The user interface may include a comment input area 302 for the author to enter the comment and a recommended hash tag area 896 to present the recommended hash tags to the author. The user interface may include options to enable the author to select the hash tags. There may also be options to allow the author to automatically insert the first hash tag in the prioritized list into the comment. In this example the published comment along with the selected hash tags are displayed in the published comment area 897.

Intelligent Data Operating Layer (IDOL) Server

FIG. 9 illustrates an example block diagram of some modules of an IDOL server, in accordance with some embodiments. IDOL server 900 may include automatic hyperlinking module 905, automatic categorization module 910, automatic query guidance module 915, automatic taxonomy generation module 920, profiling module 925, automatic clustering module 930, and conceptual retrieval module 935. The automatic hyperlinking module 905 is configured to allow manual and fully automatic linking between related pieces of information. The hyperlinks are generated in real-time at the moment the document is viewed. The automatic categorization module 910 is configured to allow deriving precise categories through concepts found within unstructured text, ensuring that all data is classified in the correct context.

The automatic query guidance module 915 is configured to provide query suggestions to find most relevant information. It identifies the different meanings of a term by dynamically clustering the results into their most relevant groupings. The automatic taxonomy generation module 920 is configured to automatically generate taxonomies and instantly organizes the data into a familiar child/parent taxonomical structure. It identifies names and creates each node based on an understanding of the concepts with the data set as a whole. The profiling module 925 is configured to accurately understand individual's interests based on their browsing, content consumption and content contribution. It generates a multifaceted conceptual profile of each user based on both explicit and implicit profiles.

The automatic clustering module 930 is configured to help analyze large sets of documents and user profiles and automatically identify inherent themes or information clusters. It even cluster unstructured content exchanged in emails, telephone conversations and instant messages. The conceptual retrieval module 935 is configured to recognize patterns using a scalable technology that recognizes concepts and find information based on words that may not be located in the documents. It should be noted that the IDOL server 900 may also include other modules and features that enable it to analyze the comment 605 and the linked content sent by the concept analysis module 615 (illustrated in FIG. 6).

Computing System

FIG. 1 illustrates a block diagram of an example computing system that may use an embodiment of one or more of the software applications discussed herein. The computing system environment 100 is only one example of a suitable computing environment, such as a client device, and is not intended to suggest any limitation as to the scope of use or functionality of the design. Neither should the computing environment 100 be interpreted as having any dependency or requirement relating to any one or combination of components illustrated in the exemplary operating environment 100.

The design is operational with numerous other general purpose or special purpose computing system environments or configurations. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The design may be described in the general context of computing device executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

The design may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary computing type system for implementing the design includes a general-purpose computing device in the form of a computer 110. Components of computer 110 may include, but are not limited to, a processing unit 120 having one or more processing cores, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computer 110 typically includes a variety of computing machine readable media. Computing machine readable media can be any available media that can be accessed by computer 110 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules, or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet. A browser application may be resident on the computing device and stored in the memory.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present design can be carried out on a computing system such as that described with respect to FIG. 1. However, the present design can be carried out on a server, a computer devoted to message handling, or on a distributed system in which different portions of the present design are carried out on different parts of the distributed computing system.

Another device that may be coupled to bus 111 is a power supply such as a battery and Alternating Current adapter circuit. As discussed above, the DC power supply may be a battery, a fuel cell, or similar DC power source that needs to be recharged on a periodic basis. The wireless communication module 172 may employ a Wireless Application Protocol to establish a wireless communication channel. The wireless communication module 172 may implement a wireless networking standard such as Institute of Electrical and Electronics Engineers (IEEE) 802.11 standard, IEEE std. 802.11-1999, published by IEEE in 1999.

While other systems may use, in an independent manner, various components that may be used in the design, a comprehensive, integrated system that addresses the multiple advertising system points of vulnerability described herein does not exist. Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Network Environment

FIG. 2 illustrates a network environment 200 in which the techniques described may be applied. The network environment 200 has a network 202 that connects server computing systems 204-1 through 204-n, and at least one or more client computing systems 208-1. As shown, there may be many server computing systems 204-1 through 204-n and many client computing systems 208-1 through 208-n connected to each other via a network 202, which may be, for example, the Internet. Note, that alternatively the network 202 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 208-1 and the server computing system 204-1 can both initiate and respond to communications, their communication may be viewed as peer-to-peer. Likewise, communications between the client computing systems 204-1 and 204-2, and the server computing systems 208-1 and 208-2 may be viewed as peer-to-peer if each such communicating device is capable of initiation and response to communication. One or more of the server computing systems 204-1 to 204-n may be associated with a database such as, for example, the databases 206-1 to 206-n. A firewall such as, for example, the firewall 220 may be established between a client computing system 208-3 and the network 202 to protect data integrity on the client computing system 208-3.

FIG. 2 also illustrates a block diagram of an embodiment of a server computing system to display information, such as a web page, etc. The application, such as a social network application (e.g., Twitter), when executed on the server computing system 204-1, causes the server computing system 204-1 to display windows and user interface screens on a portion of a media space, such as a web page. A user via a browser from the client computing system 208-1 may interact with the web page, and then supply input to the query/fields and/or service presented by a user interface of the application. The web page may be served by a web server computing system 204-1 on any Hypertext Markup Language (HTML) or Wireless Access Protocol (WAP) enabled client computing system 208-1 or any equivalent thereof. For example, the client mobile computing system 208-1 may be a smart phone, a touch pad, a laptop, a netbook, etc. The client computing system 208-1 may host a browser to interact with the server computing system 204-1. Each application, widget, plug-in, etc. has a code scripted to perform the functions that the software component is coded to carry out such as presenting fields and icons to take details of desired information. The applications may be hosted on the server computing system 204-1 and served to the browser of the client computing system 208-1. The applications then serve pages that allow entry of details and further pages that allow entry of more details.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the computing machine readable medium may be used in the process of creating the apparatuses and/or methods described herein.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

The present concept also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computing system bus. Portions of any modules or components described herein may be implemented in lines of code in software, configured logic gates in software, or a combination of both, and the portions implemented in software are tangibly stored on a computer readable storage medium. The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

What is claimed is:

1. A computer-generated method for recommending hash tags for inclusion in comments to be posted in a social network application, the method comprising:
   receiving portions of a new comment while the new comment is being generated by a user of a social network application;
   analyzing the portions of the new comment to determine concept information included in the new comment so that one or more relevant hash tags may be suggested to a user generating the new comment, wherein analyzing the portions of the new comment includes
      determining if a link is included in the new comment,
      in response to determining that a link is included in the new comment, extracting content that is referenced by the link, and
      determining the concept information from the extracted content;
   determining hash tags associated with the concept information, wherein the hash tags are stored in a hash tag database;
   prioritizing the hash tags based at least on 1) how recently the hash tags have been used in other comments posted in the social network application and 2) a maximum reach and impact of adding the hash tags to the new comment;
   presenting the hash tags in a prioritized order to enable the user to select one or more of the hash tags to be included in the new comment; and
   posting the new comment along with the selected one or more hash tags in the social network application.

2. The method of claim 1, wherein the hash tags are prioritized based on frequency of use.

3. The method of claim 1, wherein the maximum reach based on reach and influence information of an author of a comment where at least one of the hash tag has previously been included.

4. The method of claim 3, wherein the maximum reach is based on a number of primary followers associated with the author and based on a number secondary followers associated with each of the primary followers.

5. The method of claim 1, wherein the concept information included in the new comment is determined using a concept server computing system configured with an Intelligent Data Operating Layer (IDOL) application.

6. The method of claim 5, wherein the user generates the new comment using a mobile computing device wirelessly connected to an Internet coupled with the concept server computing system, and wherein functionalities of the concept server computing system is mirrored across other server computing systems coupled to the Internet and located at different geographical areas.

7. The method of claim 1, wherein said determining the hash tags associated with the concept information included in the new comment comprises:
   using the concept information included in the new comment to match with a concept information stored in the hash tag database; and using hash tags associated with the concept information stored in the hash tag database as the hash tags associated with the concept information included in the new comment.

8. The method of claim 1, wherein said presenting the hash tags in the prioritized order comprises providing the user an option to have one of the hash tags in the prioritized order to be automatically included in the new comment.

9. The method of claim 8, wherein the new comment, the hash tags selected to be included in the new comments, and the concept information associated with the new comment are stored in the hash tag database, and the comments to be posted in a social network application is a tweet on the twitter network.

10. The method of claim 1, wherein presenting the hash tags in a prioritized order further comprises indicating how the hash tags may affect a length limit of the new comment.

11. A non-transitory computer-readable media that stores instructions, which when executed by a machine, cause the machine to perform operations comprising:
   recommending hash tags to a user who is generating a new comment to be posted in an Internet web site, the hash tags recommended based on concept information included in the new comment, the concept information determined by a concept server computing system based on content of the new comment, the recommended hash tags previously stored in a hash tag database and generated by analyzing a plurality of existing comments, wherein the recommending includes:
      determining if a link is included in the new comment,
      in response to determining that a link is included in the new comment, extracting content that is referenced by the link, and
      determining the concept information from the extracted content;
   presenting to the user the recommended hash tags in a prioritized order determined based on how recently the hash tags have been used in other posted comments and a maximum reach and impact of adding the hash tags to the new comment;
   providing a user interface to enable the user to select the recommended hash tags; and
   publishing the new comment with the hash tags that are selected by the user.

12. The non-transitory computer-readable media of claim 11, wherein the maximum reach is dependent on primary followers and secondary followers of one or more users who previously included the hash tags in one or more of their comments.

13. The non-transitory computer-readable media of claim 11, wherein the concept server computing system is configured with an Intelligent Data Operating Layer (IDOL) application, and wherein the user generates the new comment using a mobile computing device wirelessly connected to an Internet coupled with the concept server computing system, and wherein functionalities of the concept server computing system is mirrored across other server computing systems coupled to the Internet and located at different geographical areas.

14. The non-transitory computer-readable media of claim 11, wherein the hash tags that are recommended to the user are accessed from a hash tag database which is configured to store a plurality of hash tags along with their corresponding concept information, and wherein the concept information included in the new comment is matched with the concept information stored in the hash tag database.

15. The non-transitory computer-readable media of claim 14, wherein the plurality of hash tags and their corresponding concept information in the hash tag database are generated by analyzing existing comments.

16. A system to recommend hash tags to be inserted into new comments as the new comments are being generated, the system comprising:
   a corpus analyzer, executed by a processor, to analyze corpus of existing comments to extract user-added hash tags along with concept information associated with the user-added hash tags;
   a hash tag database, executed by the processor, coupled with the corpus analyzer to store the user-added hash tags and their corresponding concept information, where the hash tag database stores information on a corpus of hash tags including hash tags having a highest reach within the social network, how recently and heavily the hash tags in the database have been used, and which concepts the hash tags in the database are associated with,
   a comment analyzer, executed by the processor, to:
      analyze a new comment as the new comment is being generated to determine concept information included in the new comment,
      determine if a link is included in the new comment,
      in response to determining that a link is included in the new comment, extract content that is referenced by the link, and
      determine the concept information from the extracted content;
      determine hash tags that are associated with the concept information from the hash tag database, and
      prioritize the hash tags based on how recently the hash tags have been used in other posted comments and a maximum reach and impact of adding the hash tags to the new comment; and
   a publisher, executed by the processor, coupled with the comment analyzer and to present the hash tags in a prioritized order to enable one of more of these hash tags to be selected.

17. The system of claim 16, wherein the comment analyzer is coupled with a concept server connected to an Internet network, the concept server implemented with an Intelligent Data Operating Layer (IDOL) application to determine the concept information associated with the new comment.

18. The system of claim 16, wherein the hash tag database is further to store reach information associated with the hash tags along with recently use information and frequency of use information.

19. The system of claim 18, wherein the reach information is determined based on primary followers and secondary followers of a user who has included at least one of the hash tags in one or more posted comments.

20. The system of claim 16, wherein the publisher is to indicate how the hash tags may affect a length limit of the new comment.

* * * * *